(12) United States Patent
Zhan et al.

(10) Patent No.: US 8,715,613 B2
(45) Date of Patent: May 6, 2014

(54) METHOD FOR PRODUCING OF ULTRA-CLEAN AND HIGH-PURITY AQUEOUS HYDROGEN PEROXIDE SOLUTION

(75) Inventors: Jiarong Zhan, Shanghai (CN); Zhen Song, Shanghai (CN); Xuliang Jiang, Shanghai (CN)

(73) Assignee: Shanghai Chemical Reagent Research Institute, Shanghai (CN)

( * ) Notice: Subject to any disclaimer, the term of this patent is extended or adjusted under 35 U.S.C. 154(b) by 242 days.

(21) Appl. No.: 12/981,541

(22) Filed: Dec. 30, 2010

(65) Prior Publication Data

US 2012/0141357 A1    Jun. 7, 2012

(30) Foreign Application Priority Data

Dec. 2, 2010    (CN) .......................... 2010 1 0569802

(51) Int. Cl.
*C01B 15/01*    (2006.01)
(52) U.S. Cl.
USPC .......................................................... 423/584
(58) Field of Classification Search
USPC .......................................................... 423/584
See application file for complete search history.

(56) References Cited

U.S. PATENT DOCUMENTS

| | | | |
|---|---|---|---|
| 5,296,104 A | | 3/1994 | Signorini et al. |
| 5,614,165 A | * | 3/1997 | Sugihara et al. ............... 423/584 |
| 5,670,028 A | | 9/1997 | Inaba et al. |
| 5,851,505 A | | 12/1998 | Nishide et al. |
| 5,928,621 A | * | 7/1999 | Ledon et al. ................... 423/584 |
| 7,341,636 B2 | * | 3/2008 | Wang et al. ..................... 134/42 |

FOREIGN PATENT DOCUMENTS

| | | | |
|---|---|---|---|
| CN | 1189387 C | | 2/2005 |
| CN | 101053821 A | * | 10/2007 |
| CN | 101244810 A | | 8/2008 |
| CN | 100420625 C | | 9/2008 |
| CN | 101890337 A | * | 11/2010 |
| JP | 10259008 A | | 9/1998 |
| JP | 10297909 A | | 11/1998 |
| JP | 11035305 A | | 2/1999 |
| JP | 11292521 A | | 10/1999 |
| JP | 2000-001305 A | | 1/2000 |
| WO | 9854085 | | 12/1998 |
| WO | WO 2007129849 A1 | * | 11/2007 |

* cited by examiner

*Primary Examiner* — Melissa Stalder
(74) *Attorney, Agent, or Firm* — Soroker Agmon

(57) ABSTRACT

The present invention relates to a method for producing of ultra-clean and high-purity aqueous hydrogen peroxide solution. Industrial grade hydrogen peroxide is filtered by SBA-15 molecular sieve with which the chelator is loaded, and then it is further filtered by a hyperfiltration membrane to obtain the ultra-clean and high-purity aqueous hydrogen peroxide solution. The method provided in the present invention overcomes the problems such as complexity of operation, high energy consumption and high content of impurities in the product, and is suitable for continuous production on a large scale because of its simple equipment, simple operation, low energy consumption and stable quality of the product.

3 Claims, No Drawings

METHOD FOR PRODUCING OF ULTRA-CLEAN AND HIGH-PURITY AQUEOUS HYDROGEN PEROXIDE SOLUTION

RELATED APPLICATIONS

This application claims the benefit under 35 U.S.C. 119(a) from Chinese application No. 201010569802.6 filed on Dec. 2, 2010 of which the disclosure is hereby incorporated by reference.

FIELD OF THE INVENTION

The present invention relates to method for producing of a electronic grade chemical reagent, and in particular to the method for producing of the electronic grade ultra-clean and high-purity aqueous hydrogen peroxide solution.

BACKGROUND OF THE INVENTION

The electronic grade aqueous hydrogen peroxide solution can be used as cleaning agent for silicon pellet and as etching agent for printed circuit board, and also as the reagent for producing of electronic grade reagent such as high-purity silicic acid, so it is the indispensable electronic chemicals in electronic industry. The producing of the electronic grade aqueous hydrogen peroxide solution has a rapid development with the rapid development of the electronic industry, and with the trend of the integrated circuit's development to the miniaturization and high processing speed the requirements to the electronic aqueous hydrogen peroxide solution are more and more strictly. The conventional methods for producing the ultra-clean and high-purity aqueous hydrogen peroxide solution include Rectification, Resin Adsorption, Membrane separation, and Supercritical Fluid Extraction.

The Rectification which is the optimal method for removing inorganic impurities has a high yield and can be used for long production cycle. Both methods for producing the aqueous hydrogen peroxide solution disclosed by patent JP11292521(A) and JP2000001305(A) use the multilevel heating and evaporation to gas-liquid separation. US patent US005670028A discloses a process for preparing high purity hydrogen peroxide aqueous solution which includes the steps of distillation to remove the organic carbon impurities and inorganic impurities and vacuum rectification to obtain the aqueous hydrogen peroxide solution. US patent US005296104A disclosed a process for obtaining purified aqueous hydrogen peroxide solutions with the combination of rectification and washing. But, as we know, the rectification has a high energy consumption, the amount and the cost of the fluororesin as inner lining in the rectification tower is also high.

The Resin Adsorption used to produce of ultra-clean and high-purity aqueous hydrogen peroxide solution relates mostly to strong-acid cation exchange resin, strong-basic anion exchange resin and hydrophilic porous resin etc. And this method has high efficiency to remove impurities, low occupation of land, smart equipment combination and can obtain product of different purities. PCT patent WO98/54085A1 disclosed a method for preparing an ultrapure hydrogen peroxide solution by ion exchange in the present of ion acetate comprises at least cation-exchanging adsorbents and at least anion-exchanging adsorbents contains carboxylate ions of formula R—COO⁻ and, particularly, acetate ions. US patent US005851505A disclosed a method with two-stage ion exchange resin in-line too. Japanese patents JP10259008(A) and JP10297909(A) separately disclosed a method for production of purified hydrogen peroxide solution with combination of strong acid cation-exchanging resin and strong basic anion-exchanging resin. However, these methods of Resin Adsorption have complex process and steps, and the consumption of resin is high.

Membrane separation with a promising prospect can be operated at room temperature and without phase transformation during production. Although the method has simple operation and high purity of product, but the operating life of the membrane is short and cost is higher because of frequently replacement of the membrane, so this method is used combined with other methods. Both the Chinese patent CN1189387C which disclosed a method for producing of high purity hydrogen peroxide and CN100420625C which disclosed a method for producing of electronic grade hydrogen peroxide use combination of ion exchanging resin and membrane filtration. And Chinese patent CN101244810A disclosed a method and equipment for producing of ultra-clean and high-purity hydrogen peroxide with combination of membrane filtration and absorbent charcoal and multi-stage rectification.

Supercritical Fluid Extraction, used by Kemirachemical Oy Company locates in Finland to removing organic impurities and producing hydrogen peroxide, is the method newly developed and has simple operation, high yield and low energy consumption. But this method has low purity of product.

There is also a method of Absorbent Charcoal for producing of electronic grade aqueous hydrogen peroxide solution such as the method disclosed in Japanese patent JP11035305 (A) for production of purified aqueous hydrogen peroxide solution, i.e the charcoal is used for absorbing after it is pretreated and cleaned. But the charcoal will decompose the hydrogen peroxide.

SUMMARY OF THE INVENTION

The present invention provide a method for producing of aqueous hydrogen peroxide solution to solve the defects, such as low purity of product, complex operation or high energy consumption, existing in the prior art. Industrial grade aqueous hydrogen peroxide solution is filtered by SBA-15 molecular sieve with which the chelator is loaded. Then, it is filtered by a hyperfiltration membrane to obtain ultra-clean and high-purity aqueous hydrogen peroxide solution.

The method provided by the present invention includes the following steps: Industrial grade aqueous hydrogen peroxide solution filtrated by SBA-15 molecular sieves with which chelator is loaded under 0.1~0.15 MPa. Then, it is filtrated by a hyperfiltration membrane to obtain ultra-clean and high-purity aqueous hydrogen peroxide solution.

Preferably, the aperture of the hyperfiltration membrane is ≤0.5 μm.

Preferably, the chelator with hydroxyl and carboxyl group in molecular can be one or more compounds selected form 8-hydroxyquinoline, cyclopentanecarbooxylate acid and 1,1-dimethyl propionic acid.

More preferably, the weight ratio between the chelator and the SBA-15 molecular sieves is 2:1.

The method of preparation of the molecular sieves with which the chelator is loaded provided in the present invention includes the following steps:

SBA-15 molecular sieves are impregnated in the solution of the chelator, then they are filtered, and further cleaned by being soaked in ultra-pure water, and dried for 24 hours at 100° C. at the last.

The chelator used can be one or more compounds selected form 8-hydroxyquinoline, cyclopentanecarbooxylate acid and 1,1-dimethyl propionic acid.

Preferably, the solution of the chelator is ethanol.

More preferably, the concentration of the ethanol solution of the chelator is 10~50%.

Preferably, the time of impregnation of SBA-15 molecular sieves in the solution of the chelator is 24~48 hours.

Compared with the prior art, the present invention has the beneficial effects as following:

1): In the present invention, molecular sieves with which chelator is loaded is prepared with SBA-15 molecular sieve as carrier. So the decomposition of the hydrogen peroxide is inhibited. The SBA-15 molecular sieve has very strong adsorptive capacity to organic impurities and to metal ions after loading chelator.

2): The first step of adsorption can remove most of impurities and lead to increase the operation life of the membranes in later hyperfiltration. So the cost of production is lower.

In conclusion, two times of adsorptions and filtrations is used in the present invention to remove impurities in the raw material effectively, so that the method has high purity and stable quality of product. The method of adsorption which has simple operation and low energy consumption is suitable for producing of ultra-clean and high-purity aqueous hydrogen peroxide solution on a large scale.

DETAILED DESCRIPTION OF THE INVENTION

The method for producing of ultra-clean and high-purity aqueous hydrogen peroxide solution remove organic and metal ions impurities by the chelator adsorption first, and then remove solid particulates and inorganic impurities by membrane filtration to obtain the product which meets the SEMI C8 standard. The SBA-15 molecular sieve used in the present invention cannot react with hydrogen peroxide and can be used repeatedly. The method overcomes the defects of the prior art, such as high content of impurity, complex operation and high energy consumption.

Wherein, the compositions of the molecular sieve loading chelator include the SBA-15 molecular sieve and the chelator with hydroxyl or carboxyl group in their molecular.

The preparation of molecular sieve loading chelator includes following steps:

Chelator is dissolved in solvent to maceration extract, and SBA-15 molecular sieve is impregnated in it. The SBA-15 molecular sieve after impregnation is filtration and washed by ultra-pure water, and then dried at 100° C. for 24 hours to obtain SBA-15 molecular sieve with which chelator is loaded.

The method for producing ultra-clean and high-purity aqueous hydrogen peroxide solution includes the following steps:

Industrial grade aqueous hydrogen peroxide solution is filtered by the molecular sieve loading chelator and then filtered by hyperfiltration membrane to obtain ultra-clean and high-purity aqueous hydrogen peroxide solution available for production of electronic product.

A better understanding of the present invention for the preparation of the molecular sieve loading chelator and the production of ultra-clean and high-purity aqueous hydrogen peroxide solution is obtained when the following non-limiting detailed description, in which 8-hydroxyquinoline, cyclopentanecarbooxylate acid and 1,1-dimethyl propionic acid are example of chelator and the ethanol as solvent of the chelator maceration extract, is considered.

Wherein, the 8-hydroxyquinoline, cyclopentanecarbooxylate acid, 1,1-dimethyl propionic acid and SBA-15 molecular sieve said can be bought in market.

Embodiment 1

500 g 8-hydroxyquinoline is dissolved in 3000 g ethanol to prepare maceration extract. 250 g SBA-15 molecular sieve is impregnated in the maceration extract for 24 hours at room temperature, and then the SBA-15 molecular sieve is filtered and impregnated in ultra-pure water to be washed, and be dried for 24 hours at 100° C. to obtain the SBA-15 molecular sieve loading chelator. The molecular sieve chelator loading chelator is filled into filter column for using.

100 g 30 wt % industrial aqueous grade hydrogen peroxide solution passes through the SBA-15 molecular sieve filter column made before under 0.1 MPa, and next the industrial aqueous grade hydrogen peroxide solution is filtered by the hyperfiltration membrane of 0.5 μm aperture. The filtrate is collected to obtain ultra-clean and high-purity aqueous hydrogen peroxide solution.

The testing results of product purity are listed in Table 1.

Embodiment 2

Embodiment 1 is referenced.

500 g cylcopetanecarboxylate acid is dissolved in 4000 g ethanol to prepare maceration extract. 250 g SBA-15 molecular sieve is impregnated in the maceration extract for 48 hours at room temperature, and then the SBA-15 molecular sieve filtered is impregnated in ultra-pure water to be washed, and be dried for 24 hours at 100° C. to obtain the SBA-15 molecular sieve loading chelator. The molecular sieve chelator loading chelator is filled into filter column for using.

100 g 30 wt % industrial aqueous grade hydrogen peroxide solution passes through the SBA-15 molecular sieve filter column made before under 0.12 MPa, and next the industrial aqueous grade hydrogen peroxide solution is filtered by the hyperfiltration membrane of 0.2 μm aperture. The filtrate is collected to obtain ultra-clean and high-purity aqueous hydrogen peroxide solution.

The testing results of product purity are listed in Table 1.

Embodiment 3

Embodiment 1 is referenced. The method in the present invention for producing ultra-clean and high-purity aqueous hydrogen peroxide solution can also produce the product up to SEMI C8 standard by using 1,1-dimethyl propionic acid as chelator.

500 g 1,1-dimethyl propionic acid is dissolved in 5000 g ethanol to prepare maceration extract. 250 g SBA-15 molecular sieve is impregnated in the maceration extract for 48 hours at room temperature, and then the SBA-15 molecular sieve filtered is impregnated in ultra-pure water to be washed, and be dried for 24 hours at 100° C. to obtain the SBA-15 molecular sieve loading chelator. The molecular sieve chelator loading chelator is filled into filter column for using.

100 g 30 wt % industrial aqueous grade hydrogen peroxide solution passes through the SBA-15 molecular sieve filter column made before under 0.15 MPa, and next the industrial aqueous grade hydrogen peroxide solution is filtered by the hyperfiltration membrane of 0.2 μm aperture. The filtrate is collected to obtain the ultra-clean and high-purity aqueous hydrogen peroxide solution.

The testing results of product purity are listed in Table 1.

TABLE 1 testing results of the product in embodiment 1~3

| Item | SEMI C8 standard | embodiment 1 | embodiment 2 | embodiment 3 |
|---|---|---|---|---|
| Assay($H_2O_2$) | 30.0-32.0% | 31.1% | 30.6% | 31.6% |
| Color(APHA) | 10 max | <10 | <10 | <10 |
| Chloride(Cl) | 200 ppb max | <200 ppb | <200 ppb | <200 ppb |
| Nitrate($NO_3$) | 400 ppb max | <400 ppb | <400 ppb | <400 ppb |
| Phosphate ($PO_4$) | 200 ppb max | <200 ppb | <200 ppb | <200 ppb |
| Sulfate($SO_4$) | 200 ppb max | <200 ppb | <200 ppb | <200 ppb |
| Total Organic Carbon(TOC) | 200 pp max | <200 ppb | <200 ppb | <200 ppb |
| Total Oxidable Carbon(TOC) | — | — | — | — |
| Free Acid | 0.6 µeq/g max | 0.56 µeq/g | 0.41 µeq/g | 0.57 µeq/g |
| Aluminium(Al) | 1 ppb max | <1 ppb | <1 ppb | <1 ppb |
| Antimony(Sb) | 1 ppb max | <1 ppb | <1 ppb | <1 ppb |
| Arsenic(As) | 1 ppb max | <1 ppb | <1 ppb | <1 ppb |
| Arsenic & Antimony (as As) | — | — | — | — |
| Barium(Ba) | — | — | — | — |
| Beryllium(Be) | — | — | — | — |
| Bismuth(Bi) | — | — | — | — |
| Boron(B) | 1 ppb max | <1 ppb | <1 ppb | <1 ppb |
| Cadmium(Cd) | 1 ppb max | <1 ppb | <1 ppb | <1 ppb |
| Calcium(Ca) | 1 ppb max | <1 ppb | <1 ppb | <1 ppb |
| Chromium(Cr) | 1 ppb max | <1 ppb | <1 ppb | <1 ppb |
| Cobalt(Co) | 1 ppb max | <1 ppb | <1 ppb | <1 ppb |
| Copper(Cu) | 1 ppb max | <1 ppb | <1 ppb | <1 ppb |
| Gallium(Ga) | — | — | — | — |
| Germanium (Ge) | — | — | — | — |
| Gold(Au) | 10 ppb max | <10 ppb | <10 ppb | <10 ppb |
| Indium(In) | — | — | — | — |
| Iron(Fe) | 1 ppb max | <1 ppb t | <1 ppb | <1 ppb |
| Lead(Pb) | 1 ppb max | <1 ppb | <1 ppb | <1 ppb |
| Lithium(Li) | 1 ppb max | <1 ppb | <1 ppb | <1 ppb |
| Magnesium (Mg) | 1 ppb max | <1 ppb | <1 ppb | <1 ppb |
| Manganese (Mn) | 1 ppb max | <1 ppb | <1 ppb | <1 ppb |
| Molybdenum (Mo) | 1 ppb max | <1 ppb | <1 ppb | <1 ppb |
| Nickel(Ni) | 1 ppb max | <1 ppb | <1 ppb | <1 ppb |
| Niobium(Nb) | — | — | — | — |
| Platinum(Pt) | — | — | — | — |
| Potassium(K) | 1 ppb max | <1 ppb | <1 ppb | <1 ppb |
| Silver(Ag) | 1 ppb max | <1 ppb | <1 ppb | <1 ppb |
| Sodium(Na) | 1 ppb max | <1 ppb | <1 ppb | <1 ppb |
| Strontium(Sr) | 1 ppb max | <1 ppb | <1 ppb | <1 ppb |
| Tantalum(Ta) | — | — | — | — |
| Thallium(Tl) | — | — | — | — |
| Tin(Sn) | 1 ppb max | <1 ppb | <1 ppb | <1 ppb |
| Titanium(Ti) | 1 ppb max | <1 ppb | <1 ppb | <1 ppb |
| Vanadium(V) | 1 ppb max | <1 ppb | <1 ppb | <1 ppb |
| Zinc(Zn) | 1 ppb max | <1 ppb | <1 ppb | <1 ppb |
| Zirconium(Zr) | — | — | — | — |
| ≥0.5 µm particulate | 25 pcs/ml max | 21 pcs/ml | 18 pcs/ml | 16 pcs/ml |

Wherein, the content of hydrogen peroxide is tested by Chemical Analysis, the organic carbon is analyzed by Total Organic Carbon (TOC) Analyzer (TOC-VCPH), the cations are analyzed by ICP-MS, the anions are analyzed by Ion Exchange Chromatography (IC), and the particulate of ≥0.5 µm is analyzed by Laser Particle Counter (RION 40KAF).

From Table1, we can see that the ultra-clean and high-purity aqueous hydrogen peroxide has stable quality and the purity is up to SEMI C8 standard.

It will be appreciated that the description of the embodiments above is only the illustrations of application, and doesn't limit the invention to the specific embodiments illustrated. Numerous other ways of carrying out the method provided by the present invention may be devised by a person skilled in the art without departing from the scope of the invention, and are thus encompassed by the present invention. So that it should be understood that any identical shifting can be done without departing from the scope of the present invention.

The invention claimed is:

1. A method for producing ultra-clean and high-purity aqueous hydrogen peroxide solution characterized in that the method includes the following steps:
   industrial grade aqueous hydrogen peroxide solution is filtered by SBA-15 molecular sieves onto which the chelator is loaded and then the said industrial grade aqueous hydrogen peroxide solution is filtered by a hyperfiltration membrane under the pressure of 0.1~0.15 MPa to obtain the ultra-clean and high-purity aqueous hydrogen peroxide solution;
   wherein the chelator is cyclopentane-methanoic acid or 1,1-dimethyl propionic acid, or their mixture; and
   wherein the SBA-15 molecular sieves onto which the chelator is loaded are prepared by the following steps: the SBA-15 molecular sieves are impregnated in the solution of the chelator, then they are filtered, and further cleaned by being soaked in ultra-pure water, and, lastly, dried for 24 hours.

2. A method according to claim 1, characterized in that the aperture of the hyperfiltration membrane is ≤0.5 µm.

3. A method according to claim 1, characterized in that the weight ratio between the chelator and the SBA-15 molecular sieves is 2:1.

* * * * *